Jan. 30, 1951   T. T. BUNCH   2,539,610
CHUCK FOR USE WITH ROTARY TOOLS
Filed April 5, 1947
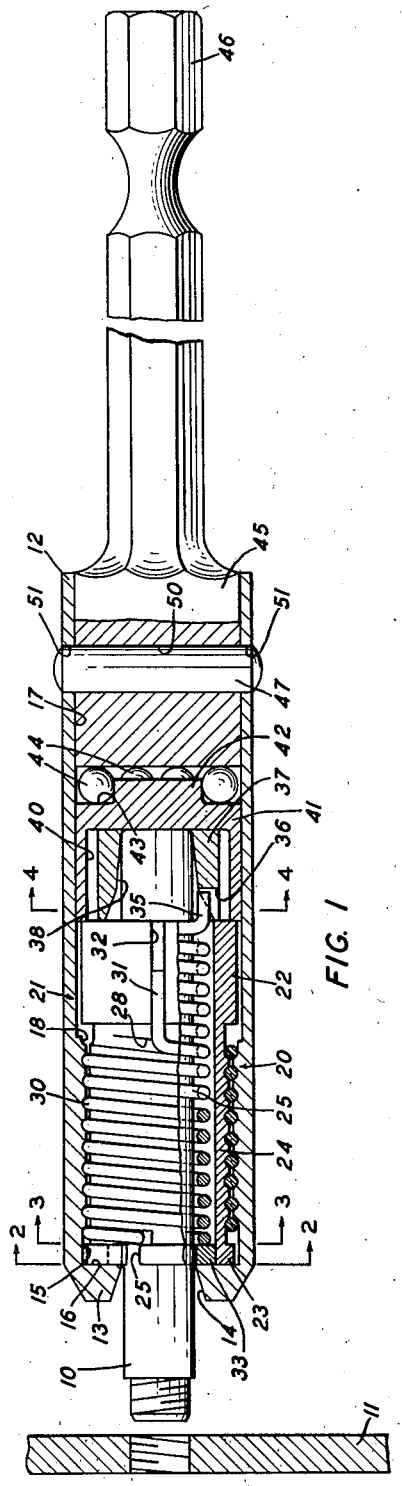
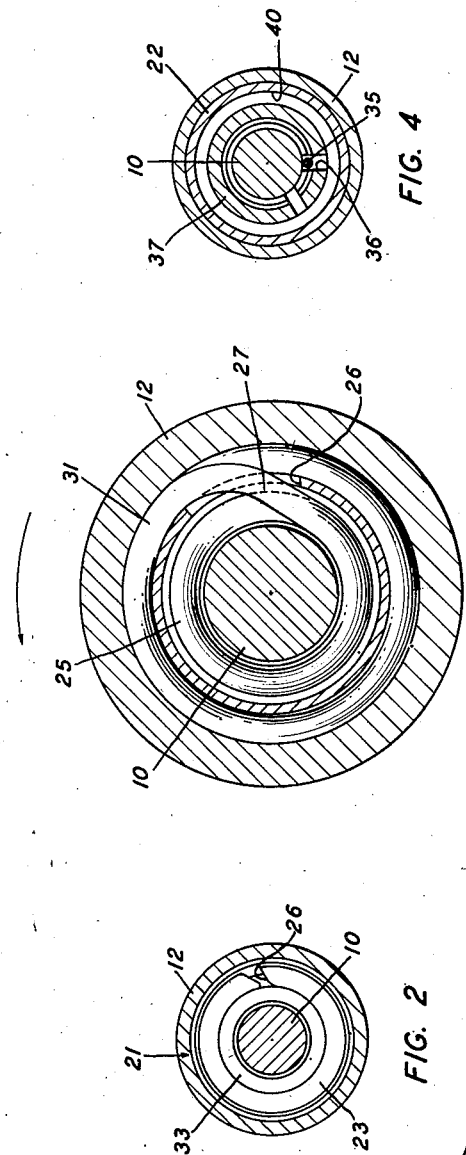
INVENTOR
T.T. BUNCH
BY
ATTORNEY Patented Jan. 30, 1951

2,539,610

UNITED STATES PATENT OFFICE 2,539,610

CHUCK FOR USE WITH ROTARY TOOLS

Tillman T. Bunch, Towson, Md., assignor to Western Electric Company, Incorporated, New York, N. Y., a corporation of New York Application April 5, 1947, Serial No. 739,731

9 Claims. (Cl. 81—53)

This invention relates to chucks for use with rotary tools, and more particularly to chucks for frictionally driving cylindrical articles such as studs, pins, or the like.

The manufacture of various types of products requires a compact assembly of plurality of parts on a suitable support. In such assembly operations, it is often necessary to threadedly insert a headless, cylindrical stud in a tapped hole in the support. Since the cylindrical article involved is headless, the customary hand tools, such as pliers, wrenches and the like cannot be used readily to manipulate the stud. In addition, the conventional hand tools usually are provided with a rough gripping face, which if used on a smooth surface tends to mar the surface. Therefore, such hand tools cannot be used with any degree of satisfaction. Their use is limited further by the fact that in many instances the stud must be inserted in a relatively small working space because a plurality of other parts already have been assembled on the support.

The present day assembly line methods of mass production of products, requiring the assembly of plurality of parts on a chassis, necessitate the use of power operated hand tools, such as electric or air driven screwdrivers, screw-guns, or the like. These power tools are usually provided with a chuck designed to hold screwdriver bits for assembling screws in wood or metal supports and socket wrenches for running nuts on studs or assembling machine screws in a support. Key operated jaw chucks are available for such devices, but this type of chuck will not grip a cylindrical article, such as a headless stud quickly. In addition the jaws of such a chuck may severely mar the surface of the cylindrical article in the same way as do hand tools. Obviously, in order to facilitate a rapid assembly of cylindrical articles on a support, either by hand or power tools, it is desirable to provide a friction chuck usable with either type of tool, which will grip a cylindrical article tightly and rotate it without marring the surface of the cylindrical article.

An object of the invention is to provide new and improved chucks for use with rotary tools.

Another object of the invention is to provide new and improved chucks for frictionally engaging cylindrical articles.

A further object of the invention is to provide a new and improved chuck that automatically and instantaneously engages a cylindrical article when rotated in the driving direction and automatically and instantaneously disengages the article when the driving rotation ceases.

In accordance with one device embodying features of the invention, there is provided a friction chuck having a helical resilient jaw in which a cylindrical article to be driven by the chuck may be inserted, and a split actuator arranged to frictionally engage the end of the article positioned in the resilient jaw so that upon rotation of the chuck, the article positioned within the resilient jaw tends to retard the rotation of the actuator which in turn causes the resilient jaw to grip the article tightly and to rotate it with the chuck.

A clear understanding of the invention may be had from the following detailed description of a device illustrating features of the invention, when read in conjunction with the appended drawing, in which:

Fig. 1 is a fragmentary, longitudinal sectional view of a chuck embodying features of the invention;

Fig. 2 is a transverse sectional view taken along line 2—2 of Fig. 1;

Fig. 3 is an enlarged, transverse sectional view taken along line 3—3 of Fig. 1, and Fig. 4 is a transverse sectional view taken along line 4—4 of Fig. 1.

Referring now to the drawing, and more particularly to Fig. 1, there is illustrated a friction chuck designed in accordance with a preferred embodiment of the invention engaging a cylindrical stud 10 preparatory to threading the end of the stud 10 into a suitable support indicated generally at 11. The chuck illustrated consists of a tubular body 12 having the right hand end 13 thereof provided with a tapered bore 14, which facilitates the insertion of the stud 10 in the friction chuck. The body 12 is provided with a short counterbore 15 adjacent to the end 13 which serves to form a shoulder 16 between the bore 14 and the counterbore 15. A substantial portion of the opposite end of the body 12 is provided with a counterbore 17 and the internal section of the body 12 disposed between the counterbore 15 and the counterbore 17 is provided with a semi-circular type of screw thread 18. The diameter of the counterbore 15 is designed to be substantially equal to the root diameter of the thread 18 provided adjacent thereto.

A resilient type of jaw 20 consists of a tubular member 21 having a head 22 on one end thereof, a shoulder 23 on the opposite end thereof and an undercut body portion 24 disposed therebetween. A helical spring 25 is positioned within the internal bore of the tubular member 21, so that the left hand end 27 thereof extends therefrom through a slot 26 provided in the left end of the member 21 (Figs. 1 and 3) to the outer periphery of the body 24. The portion of the left end 27 of the spring 25 which passes through the slot 26 is formed into as long an arc as the slot 26 will permit so that the end 27 is tangent to the periphery of the body 24 of the member 29. The left end 27 of the spring is thereafter wound around a semi-circular thread 28 provided in the body 24 of the tubular member 21 to form a helical member 30. The pitch of the thread 28 is identical with the pitch of the thread 18 provided in the body 12.

The right end of the helical member has a tang 31 formed at right angles thereto for engaging a groove 32 provided in the head 22 of the tubular member 21. The internal bore of the spring 25 is designed to be slightly over-size with respect to the diameter of the stud 10 in order that a neat sliding fit is obtained between the spring and the stud. A hardened steel bushing 33 is pressed into the left end of the internal bore of the member 20 to hold the left end 27 of the spring 25 in the slot 26. The bore of the bushing 33 is substantially equal to the internal diameter of the spring 25, thereby providing a bearing for the stud 10 inserted in the spring 25 and preventing over-size studs from being inserted in the chuck.

Since the helical member 30 is wound in the semi-circular thread 28 of the tubular body 21, it forms the male portion of a substantially semi-circular thread which permits the resilient jaw 20 to be threadedly mounted in the semi-circular thread 18 of the body 12. The resilient jaw assembly 20 is threaded into the body 12 until the left end thereof engages the shoulder 16 provided between the counterbore 15 and the bore 14 of the body 12. The free end of the spring 25 has a tang 35 formed at right angles thereto for engaging a slot 36 provided in face of an actuator 37. The actuator 37 is in the form of a split ring having a tapered bore 38 whose major diameter is slightly over-size with respect to the diameter of the stud 10, and whose minor diameter is slightly undersize with respect to the diameter of the stud. The undersize portion of the tapered bore 38 causes the actuator 37 to frictionally engage the end of the cylindrical stud 10 positioned in the spring 25 of the resilient jaw 20.

The actuator 37 is slidably positioned within a counterbore 40 provided in a bearing member 41 positioned in the bore 17 of the tubular body 12 so that the tapered bore 38 is substantially aligned with the central axis of the spring 25. Sufficient annular clearance is provided between the counterbore 40 and the actuator 37 so that when the actuator is expanded by insertion of a stud therein it will not engage the inner walls of the wall of the counterbore. A central hub 42 is formed on the bearing 41 and serves to form an annular track 43 between the periphery of the hub 42 and the bore 17 of the body 12 in which track there are positioned a plurality of ball bearings 44—44. A cylindrical body portion 45 of a hexagonal shank 46 is positioned in the bore 17 of the body 12 so that the left end of the body portion 45 engages the ball bearings 44—44. The shank 46 is secured to the body 12 by means of a pin 47 positioned in a bore 50 provided in the body portion 45 and diametrically opposed bores 51—51 provided in the body 12. The shank 46 is secured to the body 12 so that the body portion 45 thereof maintains the bearing 41 and the split ring 37 against the end of the resilient jaw 20.

The shank 46 is hexagonal in cross section so that it may be engaged securely by the jaws of a conventional key operated chuck usually provided on power operated hand tools, such as electric screwdrivers, screw guns, or the like. Obviously, the contour of the shank may be such as to permit it to fit into any particular type of tool with which it is to be used. For example, it may be formed like the end of a bit used in a hand actuated brace, or the like.

*Operation*

In the operation of the above-described chuck, let it be assumed that the shank 46 of the chuck has been secured in a key operated drill chuck of a conventional, power operated screwdriver, a screw-gun, or the like. Generally, such power operated tools are provided with a clutch which prevents the motor thereof from driving the tool chuck until pressure is actually applied on the tool clamped in the chuck. In addition, when the tool secured in the chuck is prevented from turning by the work engaged by the tool, the clutch will disengage the chuck from the motor and allow the motor to run under a predetermined torque. Having clamped the friction chuck in the chuck of such a power operated tool, a cylindrical stud, such as the stud 10, is inserted in the chuck through the tapered bore 14 of the body 12 until the end of the stud passes through the bore of the spring 25 and engages the actuator 37 (Fig. 1). The power tool then is manipulated so as to cause the threaded end of the stud to engage the tapped hole provided in the support 11. In so doing, sufficient pressure is applied on the stud to cause the clutch of the power operated tool to be engaged, thereby causing the friction chuck to be rotated by the power tool and thread the stud into the tapped hole in the support.

The design of the resilient jaw 20 of the friction chuck is such that the chuck must be rotated in a counterclockwise direction, when viewed in Fig. 3. When the friction chuck is rotated in this direction, the actuator 37, which frictionally engages the end of the stud 10, is thereby momentarily prevented from turning with the chuck. In other words, the stud 10 tends to hold the actuator 37 from rotating with the chuck, and in so doing, the actuator 37 being engaged with the end 35 of the spring 25 causes the adjacent coils of the spring to wind up tightly around the periphery of the stud 10. Since only a very small clearance is provided between the internal bore of the spring 25 and the diameter of the stud 10, the coils of the spring automatically and instantaneously grip the stud upon rotation of the chuck in its driving direction. When the coils of the spring 25 grip the stud 10 tightly, the stud will be rotated with the friction chuck which is being driven by the power tool.

When the stud has been completely threaded into the tapped hole provided in the support, the resilient jaw 20 by virtue of its tight grip on the stud 10 will cause the clutch of the power tool to slip, permitting the tool chuck and the friction chuck to remain stationary with the tool. When this slipping action occurs in the clutch of the power tool, downward pressure on the friction clutch is relaxed by the operator, which causes the clutch thereof to disengage the tool chuck from the motor of the tool thereby terminating the application of torque to the friction clutch. When this occurs, the friction chuck may be withdrawn freely from the stud 10 due to the fact that the coils of the spring 25 instantly release their grip on the stud 10 upon cessation of the driving rotation of the chuck.

The salient feature of the friction chuck is the resilient jaw 20, which consists of the spring 25 and the helical member 30 wound on the threaded body 24 of the tubular member 21. The wire from which the spring 25 and the helical member 30 is wound should have a high tensile strength and a low modulus of elasticity in order to provide a resilient jaw which will have a substantially long life. The bore of the internal spring 25 is designed to be very slightly oversize with respect to the diameter of the stud because the life of the spring 25 is determined by the extent to which the coils of the spring must be constricted in order to grip the stud.

The helical member 30 not only serves as means for threading the resilient jaw 20 in the body 12, but acts as an anchoring means for the left end 27 of the spring 25. By anchoring the left end 27 of the spring 25 in this manner, the stresses set up therein when the spring is constricted by the actuator 37 are distributed along a substantial length of wire, thereby avoiding failures of the jaw 20 that would occur due to concentrated stresses that would be encountered if the end 27 were clamped at a point. The wearing qualities of the spring 25 of the resilient jaw may be improved by chromium plating the spring wire either before the resilient jaw member is formed or after the resilient jaw member is completely fabricated.

The actuator 37 is designed to frictionally engage only those studs for which the spring 25 of the resilient jaw 20 was designed, because undersize studs would require too great a constriction of the spring 25 in order for the chuck to rotate such undersize studs. When the constriction of the spring 25 exceeds a safe working value of the spring 25, the life of the resilient jaw 20 is materially shortened. A very slight frictional engagement between the actuator 37 and the stud 10 will constrict the spring so as to produce a gripping action on the stud many times greater than the drag imposed by the stud on the actuator.

It will be noted from Fig. 1 of the drawing that the spring 25 and the helical member 30 are wound from round wire, whereupon the type of grip obtained between the coils of the spring 25 and the stud 10 is substantially a line contact type of grip. In view of the fact that a line contact grip is obtained on the stud 10 by the resilient jaw 20, it is believed to be apparent that the presence of a lubricant, of of one kind or other, on the surface of the stud 10 would not cause the resilient jaw 20 to slip on the stud. If a greater gripping force is required of the resilient jaw 20, it is possible to wind the spring 25 and the helical member 30 from square wire, whereby a substantially greater gripping force is provided in the friction chuck so constructed.

It should also be noted that while the friction chuck described hereinabove has been illustrated as being particularly well adapted for use with power operated tools, it may, of course, be used with suitable hand tools, such as a tap wrench, with the same satisfactory results. The friction clutch described hereinabove is particularly well adapted for assembly line operations requiring the assembly of a large number of the same size studs on suitable supports, for, as pointed out above, the friction clutch is designed to fit a particular size stud, and each different size stud would require its respective chuck. However, in manufacturing processes employing mass production assembly line operations, it is generally the rule that a separate power operated tool is provided at each different assembly station along the assembly line, in which case the type of friction clutch described herein would be a very useful tool.

While the above-described friction chuck has been described as being particularly well adapted for frictionally driving cylindrical articles, such as the stud 10, it may be used to assemble nuts on threaded studs simply by placing in the resilient jaw of the chuck a cylindrical shank having a nut receiving socket on the end thereof. It is also believed to be apparent that the friction clutch is capable of effecting an assembly operation of a cylindrical article or a nut in a relatively smaller working area than that required by the conventional type of drill chucks provided on hand operated power tools used in various types of assembly operations.

What is claimed is:

1. A chuck for frictionally engaging a cylindrical article, which comprises a tubular body having a shank on one end thereof for engagement with a suitable tool used to rotate the chuck and a tapered bore in the opposite end thereof which facilitates easy insertion of a cylindrical article in the chuck, a tubular resilient jaw threadedly positioned within the body adjacent to said tapered bore for slidably receiving internally thereof the cylindrical article, and an actuator positioned in the body so as to engage the free end of the resilient jaw, said actuator having a tapered bore therethrough for frictionally receiving the end of the article inserted in the resilient jaw, whereby when the chuck is rotated in its driving direction the article imposes a drag on the actuator which automatically causes the resilient jaw to be constricted and tightly grip the article and rotate it therewith.

2. A chuck for frictionally engaging a cylindrical article, which comprises a hollow cylindrical body having a shank adapted to be engaged by a tool for rotating the chuck, a resilient jaw having an inner helical spring arranged to engage a cylindrical article and having an outer coaxial helical member threadedly engaged by the body, and a split ring engaging the free end of the inner spring and having a bore therethrough for frictionally receiving a cylindrical article inserted in the resilient jaw of the chuck, whereby when a cylindrical article inserted in the chuck is engaged by the split ring rotation of the resilient jaw member automatically causes the inner spring to instantly grip the article and rotate it therewith.

3. A chuck for frictionally driving a cylindrical article, which comprises a tubular body having a shank adapted to be engaged by a tool for rotating the chuck, a resilient jaw threadedly positioned within the body, said resilient jaw comprising a tubular member and a helical spring positioned in the bore of the tubular member for receiving the article and having one end thereof wound around the periphery of the body to form an outer helical member, means provided in the tubular member for preventing oversize articles from being inserted in the spring, and means positioned within the body engaging the free end of the helical spring and having a bore therethrough for frictionally engaging the end of the cylindrical article, whereby when rotary motion is imparted to the chuck the article imposes a drag on the spring engaging means which constricts the spring so that it tightly grips the article and rotates it therewith.

4. A chuck for frictionally engaging a cylindrical article, which comprises a tubular body having a tapered bore in one end thereof for slidably receiving a cylindrical article to be engaged by the chuck, a helical spring internally disposed in the body having one end thereof adjacent to said tapered bore for slidably receiving said article, said spring having the end thereof adjacent to said tapered bore rigidly secured to said body, said spring being wound from round wire to obtain a line contact grip on the article inserted therein, and an actuator positioned in the body for engaging the free end of the spring, said actuator having a tapered bore therethrough for frictionally engaging the end of the cylindrical article inserted in the spring said tapered bore being such that it will not engage undersize articles inserted in the spring.

5. A chuck for frictionally engaging a cylindrical article, which comprises a tubular body having a tapered bore in one end thereof for slidably receiving a cylindrical article to be engaged by the chuck, means secured on the opposite end of the body for engaging a tool for rotating the body, a helical spring positioned in the body adjacent to said tapered bore for slidably receiving such an article, means for securing the end of the spring adjacent to the tapered bore rigidly to the body, means positioned in the body for preventing oversize articles from being inserted in the spring, and means positioned in the body for engaging the free end of the spring, said spring engaging means having a tapered bore therethrough for frictionally engaging the end of a cylindrical article positioned in the spring, said tapered bore of the spring engaging means being such that it will not frictionally engage undersize articles positioned in the spring, whereby when the chuck is rotated in its driving direction only a full size article imposes a drag on the spring engaging means and causes the spring to be constricted and thereby turn the cylindrical article.

6. A chuck for frictionally engaging a cylindrical article, which comprises an elongated tubular body having a tapered bore in one end thereof for effecting easy insertion of a cylindrical article in the chuck, a resilent jaw positioned in the body including an inner cylindrical coil and an outer cylindrical coil wound coaxially therewith, said outer coil being formed integrally with one end of the inner coil, the bore of said inner coil being arranged to slidably receive an article to be engaged by the chuck, means for anchoring the outer cylindrical coil to the body, and an actuator positioned within the body for engaging the free end of the inner coil and having a tapered bore therein for frictionally engaging a cylindrical article positioned within the inner coil of said resilient jaw, whereby when the chuck is rotated the article imposes a drag on the actuator automatically causing the inner coil of the resilient jaw to be constricted and tightly engage the cylindrical article and rotate it therewith.

7. A chuck for frictionally engaging a cylindrical article, which comprises a tubular body having a gauging bore in one end thereof for slidably receiving a cylindrical article to be engaged by the chuck, means secured on the opposite end of the body for engaging a tool for rotating the body, a helical spring positioned in the body adjacent to said gauging bore for slidably receiving such an article, means for securing the end of the spring positioned adjacent to the gauging bore rigidly to the body, means positioned in the body for aligning the spring coaxially with the body, means positioned in the body for engaging the free end of the spring, and means positioned in the body for aligning the spring engaging means with the spring so that the spring engaging means may be engaged by an article inserted in the spring, said spring engaging means having a bore therethrough for frictionally engaging the end of the cylindrical article and causing the coils of the spring to wind up and grip the cylindrical article when the chuck is rotated.

8. A chuck for frictionally engaging a cylindrical stud, which comprises a tubular body having a semi-circular thread provided on the inside thereof and a tapered bore in one end thereof for effecting easy insertion of a stud in the chuck, a shank secured on the opposite end of the body and adapted to be engaged by a tool for rotating the chuck, a resilient jaw including a tubular member and a helical spring positioned in the bore of the tubular member for slidably receiving the stud and having one end thereof wound around the periphery of the tubular member to form an outer helical member adapted to threadedly engage the semi-circular thread of the body, means provided in the tubular member adjacent to the tapered bore of the body for preventing oversize studs from being inserted in the resilient jaw, an actuator positioned in the body so as to engage the free end of the spring and having a tapered bore therethrough for frictionally engaging the end of the stud inserted in the resilient jaw, said actuator serving to constrict the spring to automatically grip the stud when the chuck is rotated in its driving direction, said tapered bore of the actuator being arranged so as not to engage undersize studs positioned in the chuck, and a thrust bearing positioned in the body between the actuator and the end of the shank for the longitudinal thrust encountered by the actuator when it is engaged by the stud.

9. A chuck for frictionally driving a cylindrical article, which comprises a tubular body, a resilient jaw positioned in the body which includes an inner helical spring designed to slidably receive a cylindrical article and having one end thereof wound around said inner spring to form an outer coaxial helical spring adapted to be attached to the tubular body, and means positioned in the body for causing the inner helical spring to grip the cylindrical article when the chuck is rotated in its driving direction.

TILLMAN T. BUNCH.

REFERENCES CITED

The following references are of record in the file of this patent:

UNITED STATES PATENTS

| Number | Name | Date |
|---|---|---|
| 1,127,129 | Warner, Sr., et al. | Feb. 2, 1915 |
| 2,105,330 | Pagenkoff | Jan. 11, 1938 |
| 2,251,491 | Lozen | Aug. 5, 1941 |